No. 759,008.

Patented May 3, 1904.

UNITED STATES PATENT OFFICE.

FRANCIS J. OAKES, OF NEW YORK, N. Y.

GLUCOSIDE DYE AND PROCESS OF MAKING SAME.

SPECIFICATION forming part of Letters Patent No. 759,008, dated May 3, 1904.

Application filed June 29, 1903. Serial No. 163,561. (Specimens.)

*To all whom it may concern:*

Be it known that I, FRANCIS J. OAKES, a citizen of the United States, and a resident of the borough of Manhattan, city, county, and State of New York, have invented certain new and useful improvements in processes of extracting from vegetable matters glucosides possessing coloring properties and also in the products resulting from such processes—as, for instance, dyes—of which the following is a specification.

Heretofore in the extraction of certain coloring-matters from dyewoods—as, for instance, by watery infusion or leaching—there has occurred undesirable oxidation of the resulting products both during their extraction and their subsequent concentration, an excessive percentage of the hematoxylin being thus, for instance, converted into hematine, whereby the efficiency of the said products of extraction has for certain purposes been seriously impaired. Moreover, the coloring-matters referred to being glucosides possess exceptional affinity for oxygen and are by the latter converted into glucose and other products which act with undesirable activity in reducing metallic oxids.

The objects of my present invention are to produce dyes and coloring-matters free or comparatively free from the undesirable ingredients referred to as resulting from oxidation and also a process whereby such articles may be readily, successfully, and economically manufactured. I attain the results referred to by the use of my improved process of extraction, as hereinafter described, a characteristic and essential feature of which consists, broadly, in bringing into the presence of the glucoside of the coloring-matter at what may be termed its nascent stage—that is to say, as it begins its infusion from its original vegetable container into the watery leach—carbonic-acid gas ($CO_2$) and afterward preferably continuing this association during the processes of extraction or leaching under conditions which will admit the chemical combination of the glucoside with the carbonic-acid gas as a radical.

In the application of my improved process the well-known steps and methods of treatment of the materials and resulting products are preferably all utilized, as at present well understood, in the most approved methods of the art of producing dyes or dyestuffs; but I make to such procedure the novel and important addition of utilizing the aforesaid gas as described. For instance, taking the process of extracting dye or coloring-matter from logwood, for example, instead of leaching in water or other liquid previously employed I immerse and leach the logwood in a bath of water or other liquid containing and preferably saturated with said carbonic-acid gas, care being preferably exercised to exclude from the bath as far as practicable any constituents which might tend to interfere with the chemical combination of the glucoside with the carbonic-acid gas or carbon dioxid. The carbonic-acid gas may be charged into the water by injection, preferably at or near the bottom of the leach and preferably continually during the progress of the extraction. The carbonic-acid gas is thus brought from its inception into the presence of the products resulting from the leaching of the vegetable matters treated, with the result that the undesirable oxidations of such products referred to are thereby prevented. By my said process, therefore, for instance, a solution or dye of logwood may be successfully produced and concentrated to the required point at 212° Fahrenheit under atmospheric pressure without being oxidized. It seems that by reason of my said process the glucoside extracted forms with the carbon-dioxid radical a new compound or substitution product containing said dioxid as a radical, which substitution product may be properly designated as "hematoxylin carbonate."

The resulting products of my process are distinguishable by some or all of the following characteristics, among others, viz: The resulting solution when derived from logwood, as aforesaid, is characterized by its reddish-brown color as containing, essentially, hematoxylin carbonate, as being unoxidized, not alkaline, neutral in reaction, capable of being oxidized to hematine carbonate by application of atmospheric air, and permanent in every degree of dilution. The resulting product when evaporated to dryness is likewise distinguishable as constituting a friable solid readily reduced to powder, as having a reddish-brown color, as being of crystalline character, unoxidized, not alkaline, neutral in reaction, capable when brought again into solution of being oxidized to hematine carbonate by application of atmospheric air, practically soluble in water at normal temperature, and unable to reduce metallic oxids in an alkaline bath. Speaking generally, the resulting products of my process, whether in solution or evaporated to dryness, are generally distinguishable by reason of their content of carbonic-acid gas, their freedom from undesirable results of oxidation, the permanence of their tinctorial quality when in solution, and their non-tendency to ferment after treatment.

I am aware that it has been suggested that carbonic-acid gas may be used as an external cover to exclude air from the surface of products resulting from previously-made extractions from vegetable matters and even as such cover during the process of extraction, also that after extraction has been accomplished the resulting extract has been treated by agents including or liberating such gas in the presence of constituents, such as alkalis, preventing the chemical combination of said gas with such extracts, and therefore do not wish to be understood as claiming any such processes, my process being distinguishable therefrom in that, as hereinbefore described, it involves bringing said gas into the presence of the glucoside of the extract under such conditions as to insure the new chemical combination between them which is characteristic of my product.

What I claim as new, and desire to secure by Letters Patent, is the following:

1. The herein-described process which consists in treating vegetable matter containing glucosides in an aqueous bath, and simultaneously bringing into the presence of said glucosides, in their nascent stage, while emerging from said vegetable matter into said bath, carbonic-acid gas, whereby the said glucosides and said gas are caused to unite in molecular proportions to form a new chemical compound or substitution product as for example hematoxylin carbonate.

2. The herein-described process which consists in immersing vegetable matter, containing glucosides, in water, and bringing into the presence of said glucosides during their resulting extraction from said vegetable matter carbonic-acid gas, whereby the said glucosides and said gas are caused to unite in molecular proportions to form a new chemical compound or substitution product as for example hematoxylin carbonate.

3. The herein-described process which consists in extracting glucosides from their vegetable containers in a bath containing carbonic-acid gas, whereby said glucosides are brought into the presence of said gas under such conditions as to insure their chemical combination with said gas as a radical, and the formation of a substitution product, hematoxylin carbonate.

4. The herein-described process which consists in immersing, in an aqueous bath, vegetable matter containing glucosides and, during the resulting extraction of said glucosides from said vegetable matter, injecting carbonic-acid gas into said bath, whereby said gas is brought into the presence of said glucosides in their nascent stage, substantially as and for the purposes described.

5. The herein-described process which consists in immersing in an aqueous bath vegetable matter containing glucosides and bringing carbon dioxid into the presence of said glucosides in said bath in time to insure chemical combination of said glucosides with said carbon dioxid to form a new substitution product, hematoxylin carbonate.

6. The herein-described process which consists in providing a bath of water, substituting carbonic-acid gas for air normally contained in said water, immersing in said bath so containing said carbonic-acid gas vegetable matter containing glucosides, and thereby extracting said glucosides from said vegetable matter in the presence of said carbonic-acid gas whereby is insured the chemical combination of said glucosides with said carbonic-acid gas.

7. The herein-described process which consists in providing an aqueous bath, excluding from said bath constituents disposed so as to have greater chemical affinity for glucosides than has carbonic-acid gas, introducing said gas into said bath, immersing in said bath so containing said carbonic-acid gas vegetable matter containing glucosides, and thereby extracting said glucosides from said vegetable matter in the presence of said carbonic-acid gas whereby is insured the chemical combination of said glucosides with said carbonic-acid gas.

8. The process of producing as a new composition of matter a glusoside chemically combined with carbon dioxid as a radical, which consists in leaching said glucoside out of its original vegetable container into an aqueous bath and bringing into the presence of said glucoside in said bath carbon dioxid.

9. As a new composition of matter a glucoside chemically combined with carbon dioxid as a radical.

10. As a new article of manufacture a dye derived from vegetable matter and characterized as consisting essentially of glucosides with which carbon dioxid has chemically combined as a radical to form a substitution product.

11. As an article of manufacture a coloring-matter which can be obtained by chemically combining glucosides with carbon dioxid as a radical, characterizable as comprising essentially hematoxylin carbonate, unoxidized, not alkaline, neutral in reaction, crystalline in character, practically soluble in water at normal temperature, and unable to reduce metallic oxids in an alkaline bath.

12. As a new article of manufacture the herein-described dye which can be obtained by leaching its constituent glucosides out of their original vegetable containers in a bath containing carbonic-acid gas, and which when in the dry state may be recognized by its following characteristics, viz: as having, when derived from logwood, a reddish-brown color and crystalline character, as being essentially a hematoxylin carbonate, unoxidized, not alkaline, neutral in reaction, practically soluble in water at normal temperature, unable to reduce metallic oxids in an alkaline bath, normally permanent in every degree of dilution but capable of being oxidized to hematine carbonate by application of atmospheric air.

13. As a new article of manufacture, the herein-described solution derived by leaching its glucoside constituents out of their original vegetable containers in a bath containing carbonic-acid gas and which may be recognized by its following characteristics, viz: as having, when derived from logwood, a reddish-brown color, as containing essentially hematoxylin carbonate, unoxidized, not alkaline, neutral in reaction, normally permanent in every degree of dilution, but capable of being oxidized to hematine carbonate by application of atmospheric air.

FRANCIS J. OAKES.

Witnesses:
 FRANK S. TOLMAN,
 FRANK DEVLIN.